United States Patent
Gottschall et al.

(10) Patent No.: US 11,579,512 B2
(45) Date of Patent: Feb. 14, 2023

(54) DEVICE AND METHOD FOR GENERATING LASER PULSES

(71) Applicants: FRAUNHOFER-GESELLSCHAFT ZUR FÖRDERUNG DER ANGEWANDTEN FORSCHUNG E.V., Munich (DE); FRIEDRICH-SCHILLER-UNIVERSITÄT JENA, Jena (DE)

(72) Inventors: Thomas Gottschall, Jena (DE); Jens Limpert, Jena (DE); Andreas Tünnermann, Weimar (DE)

(73) Assignee: Fraunhoefer-Gesellschaft zur Forderung der angewandten nForschung e.V., Munche (DE)

( * ) Notice: Subject to any disclaimer, the term of this patent is extended or adjusted under 35 U.S.C. 154(b) by 1094 days.

(21) Appl. No.: 16/074,240

(22) PCT Filed: Feb. 1, 2017

(86) PCT No.: PCT/EP2017/052105
§ 371 (c)(1),
(2) Date: Jul. 31, 2018

(87) PCT Pub. No.: WO2017/134078
PCT Pub. Date: Aug. 10, 2017

(65) Prior Publication Data
US 2021/0191230 A1 Jun. 24, 2021

(30) Foreign Application Priority Data

Feb. 1, 2016 (DE) .................... 10 2016 101 752.3
Feb. 23, 2016 (DE) .................... 10 2016 103 093.7

(51) Int. Cl.
*G02F 1/39* (2006.01)
*H01S 3/067* (2006.01)
(Continued)

(52) U.S. Cl.
CPC .............. *G02F 1/39* (2013.01); *H01S 3/0092* (2013.01); *H01S 3/067* (2013.01); *H01S 3/1118* (2013.01); *H01S 3/1305* (2013.01); *H01S 3/0064* (2013.01)

(58) Field of Classification Search
CPC ........ G02F 1/39; H01S 3/0064; H01S 3/0092; H01S 3/067; H01S 3/1118; H01S 3/1305
See application file for complete search history.

(56) References Cited

U.S. PATENT DOCUMENTS 9,880,446 B2 * 1/2018 Gottschall ............. G02F 1/3536
2015/0015938 A1 1/2015 Kaisha

FOREIGN PATENT DOCUMENTS

| DE | 19642925 A1 | 4/1997 | |
| WO | WO-2011106752 A2 * | 9/2011 | ............... G02F 1/39 |
| WO | 2015/063063 A1 | 5/2015 | |

OTHER PUBLICATIONS

Gottschall, et al., "Four-wave mixing based light sources for real-world biomedical applciations of coherent Raman microscopy," Proceedings of SPIE, vol. 9712, pp. 971202-1-971202-5, Mar. 14, 2016. (Year: 2016).*

(Continued)

*Primary Examiner* — Daniel Petkovsek
(74) *Attorney, Agent, or Firm* — Adams and Reese LLP; Ray R. Ferrera

(57) ABSTRACT

A device for generating laser pulses is provided, the device having an optical parametric oscillator converts the laser pulses of a pump laser to laser pulses at a signal wavelength and at an idler wavelength. The optical parametric oscillator has an optical resonator with a non-linear wavelength converter. It is an object of the invention to provide a device that makes efficient generation of synchronous laser pulse trains with two different central wavelengths possible. To this end, the invention proposes that the pump laser is tunable with (Continued)

respect to the pump wavelength and the repetition frequency, wherein the resonator has an optical fibre with a dispersion in the range of 10-100 ps/nm and a length of 10-1000 m. The invention furthermore relates to a method for generating laser pulses using such a device.

11 Claims, 3 Drawing Sheets

(51) Int. Cl.
      *H01S 3/00*         (2006.01)
      *H01S 3/1118*     (2023.01)
      *H01S 3/13*         (2006.01)

(56) References Cited

OTHER PUBLICATIONS

Gottschall, et al., "Fiber-based optical parametric oscillator for high resolution coherent anti-Stokes Raman scattering (CARS) microscopy," Opt. Express 22, pp. 21921-21928, Sep. 3, 2014. (Year: 2014).*

Erin S. Lamb, Simon Lefrancois, Minbiao Ji, William J. Wadsworth, X. Sunney Xie, and Frank W. Wise, Fiber Optical Parametric Oscillator for Coherent Anti-Stokes Raman Scattering Microscopy, Optics Letters, vol. 38, No. 20, Oct. 15, 2013. pp. 4154-4157.

* cited by examiner

DEVICE AND METHOD FOR GENERATING LASER PULSES

The invention relates to a device for generating laser pulses comprising
- a pump laser that emits laser pulses at a pump wavelength with a repetition frequency, wherein the pulse duration of the laser pulses is 0.5-100 ps, and
- an optical parametric oscillator that converts the laser pulses of the pump laser at least partially to laser pulses at a signal wavelength and at an idler wavelength, which differs from the former, wherein the optical parametric oscillator has an optical resonator, comprising
  - a non-linear wavelength converter, which converts the laser pulses of the pump laser to laser pulses at the signal wavelength and at the idler wavelength, and
  - an output coupling element, which couples at least some of the radiation out of the optical resonator.

In addition, the invention relates to a method for generating laser pulses using such a device.

For coherent Raman spectroscopy/microscopy (CRS), two synchronized laser pulse trains with repetition rates of a few MHz to a few tens of MHz are required. The energy gap between the central wavelengths of the two laser pulse trains must correspond to the Raman resonance energies of the molecules under investigation. In order, to be able to address more resonance energies and consequently different types of molecules, the energy gap between the two laser pulse trains must be variable. In addition, the laser pulses must have a peak power of more than 100 W for the resulting measurement signals to be low-noise. Since at the same time the average power (e.g. for use on living tissue) should not exceed the mW range, very short laser pulses (pulse duration between 5 ps and 50 ps) must be used to make available the required pulse peak power. In addition, the spectral bandwidth of the laser pulses for CRS must be less than 10 cm$^{-1}$ (i.e. less than 1 nm at 1000 nm central wavelength). Since the spectral bandwidth of a transform-limited laser pulse is inversely proportional to the pulse duration, the pulse duration must not fall below a specific minimum value. The central wavelengths of the laser pulses are usually chosen in the near infrared range, because the absorption (in biological material) in this range is low and the diffraction-limited spatial resolution is high. Accordingly, the laser pulses should not fall below a minimum pulse duration of approx. 1 ps to fulfil the requirements for the spectral resolution in the case of transform-limited bandwidth. The use of laser pulses in the range of 0.5-100 ps is therefore a compromise of a high spectral resolution of the Raman resonances and the generation of low-noise measurement signals by the excitation with a high pulse peak power at a compatible average power.

A device of the type mentioned in the introductory part, specifically an optical parametric oscillator (OPO) based on optical fibers, is known from the prior art. The OPO converts, in dependence on the wavelength and the repetition frequency of the pump laser, one portion of the light into laser pulses at a smaller wavelength (signal wavelength) and another portion into laser pulses at a greater wavelength (idler wavelength). The laser pulses generated in this way can be used for (imaging) CRS methods. Since the pump energy is not stored during the parametric conversion, the OPO must be pumped synchronously. For this reason, the time interval between the pump pulses, i.e. the laser pulses of the pump laser, must correspond to the round-trip time of the signal or idler radiation within the resonator of the OPO.

If the resonator length for the signal or idler wavelength is selected such that it is resonant to the repetition frequency of the pump laser and at the same time the four-wave mixing process in the corresponding wavelength range overcompensates the round-trip losses, the laser pulses are produced at the signal and idler wavelength. If the resonator length of the OPO is changed, a different wavelength range is resonant to the pump pulses. If in this wavelength range the round-trip losses within the resonator continue to be overcompensated by the amplification in the OPO, correspondingly new signal and idler wavelengths begin to oscillate.

It is an object of the invention to provide a device that makes efficient generation of synchronous laser pulse trains with two different central wavelengths possible, wherein the available tuning range with respect to the gap of the central wavelengths is intended to be enlarged with respect to the prior art.

This object is achieved by the invention proceeding from a device of the type stated in the introduction in that the pump laser is tunable with respect to the pump wavelength and with respect to the repetition frequency. Provided in the resonator is here an optical fiber with a dispersion in the range of 10-100 ps/nm and a length of 10-1000 m.

For each pump wavelength, there is due to the conservation of energy and phase matching conditions within the respective wavelength ranges of the signal and idler radiation only one wavelength triple that makes possible the maximum conversion efficiency at a specific repetition frequency of the pump laser. At the boundaries of these wavelength ranges, the conversion efficiency drops significantly. The invention proposes the use of a pump laser, which is continuously tunable with respect to the pump wavelength and the repetition frequency. Consequently, the signal and idler radiation can be produced with high efficiency over wide wavelength ranges. The pump wavelength should be tunable preferably in the range between 1015 and 1060, if possible at least between 1025 and 1050, nm. All energy gaps which are relevant for the coherent Raman spectroscopy can hereby be covered in accordance with the invention.

The pump laser has a variable (i.e. adjustable) repetition frequency, with the result that it is possible to operate with a fixed resonator length of the OPO at different pump wavelengths. The pump laser advantageously emits the laser pulses with a repetition frequency of between 1 MHz and 20 MHz, wherein a relative tunability of the repetition frequency of up to 5% suffices.

Due to the strongly dispersive optical fiber provided in accordance with the invention in the optical resonator, the resonator has a clear wavelength dependence of the effective resonator length. The optical fiber ensures a significant wavelength-dependent delay characteristic, as a result of which the laser pulses are optically stretched. This offers the advantage that changing the resonator length of the OPO or the repetition rate of the pump radiation pulses brings about a change in the wavelengths of the generated radiation. Due to the significant dispersion in the feedback branch of the resonator, the generated radiation in particular becomes substantially more narrow-banded than in conventional OPOs.

The device and the method according to the invention generate spectral bandwidths of the wavelength of the radiation which nearly correspond to the transform limit of the pulse duration of the generated radiation. These properties are based on the fact that efficient conversion of pump power to radiation power can only be effected if the temporally stretched pulses which are fed back in the resonator have a good temporal overlap with pump pulses of the pump radiation source.

Due to the strongly dispersive optical fiber in the resonator, the temporal overlap of the pump radiation and the signal radiation is fulfilled only for specific wavelength ranges. These wavelength ranges can be specified via the delay characteristic, or dispersion characteristic, of the dispersive element.

The conversion of the wavelength in the optical parametric oscillator is preferably performed by what is known as "four-wave mixing" (FWM). Similarly to the classical optically parametric frequency generation in non-linear crystals, light can be converted in microstructured fibers. The classical optically parametric frequency generation is a three-wave-mixing process which is made possible by crystal non-linearities. Since these are not present in glass fibers, non-linearities occur here at first which can convert radiation in the form of four-wave mixing. Taking into consideration the phase matching condition, the signal radiation which is necessary for example for non-linear Raman spectroscopy can thus be generated in fibers.

In an advantageous embodiment of the invention, the dispersive optical fiber is a one-mode fiber, also called mono-mode fiber or single-mode fiber. A specific wavelength is transmitted with a delay here. This results in a simple manner in a wavelength-dependent effective resonator length.

Consequently, further possibilities are available for setting the wavelength in accordance with the invention. In addition to the repetition rate of the pump radiation, the resonator length of the optical parametric oscillator, the pump pulse duration of the pump radiation or the pump pulse shape of the pump radiation can also be changed, for example. These changes can be effected alternately or simultaneously, for example to obtain a signal radiation at a specific wavelength with the smallest possible wavelength band or wavelength range by changing the resonator length and simultaneously by changing the repetition rate of the pump radiation.

In an advantageous embodiment, the resonator has a variable delay line. Thereby, the resonator length can be changed, for example mechanically by way of appropriate deflection of the radiation, specifically independently of the wavelength of the radiation in the resonator.

In other words, the core of the invention is the combination of the tunability of the pump laser with respect to pump wavelength and repetition frequency with the integration of the strongly dispersive optical fiber in the resonator of the optical parametric amplifier, which ensures temporal stretching of the signal and idler pulses in a manner such that, due to the synchronization with the pump pulses, specific narrow wavelength ranges can be selected from the dispersively stretched signal and idler radiation. This overall provides the possibility of generating narrowband laser pulses, the wavelength of which can be tuned over a wide range. The narrow bandwidth is here the result of the temporal stretching in the dispersive optical fiber in relation to the duration of the pump pulses. This provides an ideal laser pulse source for coherent Raman spectroscopy or microscopy.

The pump laser which is tunable in accordance with the invention can be provided e.g. by introducing a tunable wavelength-selective filter, by which a specific wavelength is specified, in the laser resonator of a conventional pulse laser (having a laser resonator, a saturable absorber, an optically pumped laser medium arranged in the laser resonator and an output coupler). The filter bandwidth of the wavelength-selective filter should here be 50-1000 pm. The tuning range is expediently adapted to the wavelength range in which the laser medium amplifies the radiation circulating in the laser resonator. Due to the losses for all other wavelengths in the emission range of the laser medium, a strong suppression is caused such that only the low-loss spectral transmission range of the filter permits oscillation. The output coupling losses of the laser resonator and the oscillation losses should be as homogeneous as possible over the spectral tuning range of the pump laser so that nearly constant output power is available. For this reason, a doped optical fiber should be used as the laser medium in combination with fiber-coupled components that exhibit no, or only a low, spectral variation of the transmission. Accordingly, the pump laser should preferably be a fiber laser. A suitable tunable wavelength-selective filter of the pump laser is e.g. an adjustable etalon or a fiber Bragg grating, the grating constant of which and consequently the transmission wavelength is variable by thermal or mechanical expansion. Preferably used is a fiber-coupled filter based on an optical line grating.

Arranged downstream of the pump laser in a preferred implementation of the device according to the invention is an optical amplifier which amplifies the laser pulses before they are converted in the optical parametric oscillator. The pump pulse power required for efficient wavelength conversion is produced by way of the amplifier. To set the power, the optical amplifier can have an amplitude modulator of a construction which is typical per se. An optical isolator can be arranged downstream of the optical amplifier to prevent perturbation due to back-reflections.

If needed, a pulse picker of a construction which is typical per se can be provided before or after the amplifier to lower the repetition frequency of the laser pulses.

The invention furthermore relates to a method for generating laser pulses using a device according to the invention. The method comprises at least the following steps:

generating laser pulses at a pump wavelength with a repetition frequency, feeding back radiation in the optical resonator of the device, and at least partially converting the laser pulses to laser pulses at a signal wavelength and an idler wavelength, which differs from the former, by way of the non-linear wavelength converter of the device, wherein the laser pulses are temporally stretched by the optical fiber in the resonator such that the temporal stretching of the laser pulses is 1-500 ps per nm of spectral bandwidth of the laser pulses, wherein the signal wavelength and the idler wavelength are varied by varying the pump wavelength and the repetition frequency.

Further features, details and advantages of the invention will emerge from the wording of the claims and from the description of exemplary embodiments on the basis of the figures.

The invention will furthermore be explained in more detail on the basis of the following text with reference to preferred exemplary embodiments on the basis of the figures.

IN THE FIGURES

Figure 1:
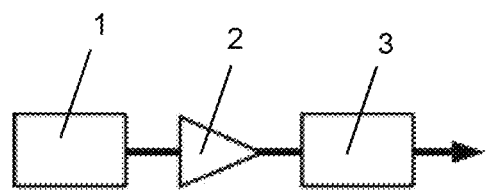
FIG. 1 shows a device according to the invention in the form of a block diagram.
Figure 6:
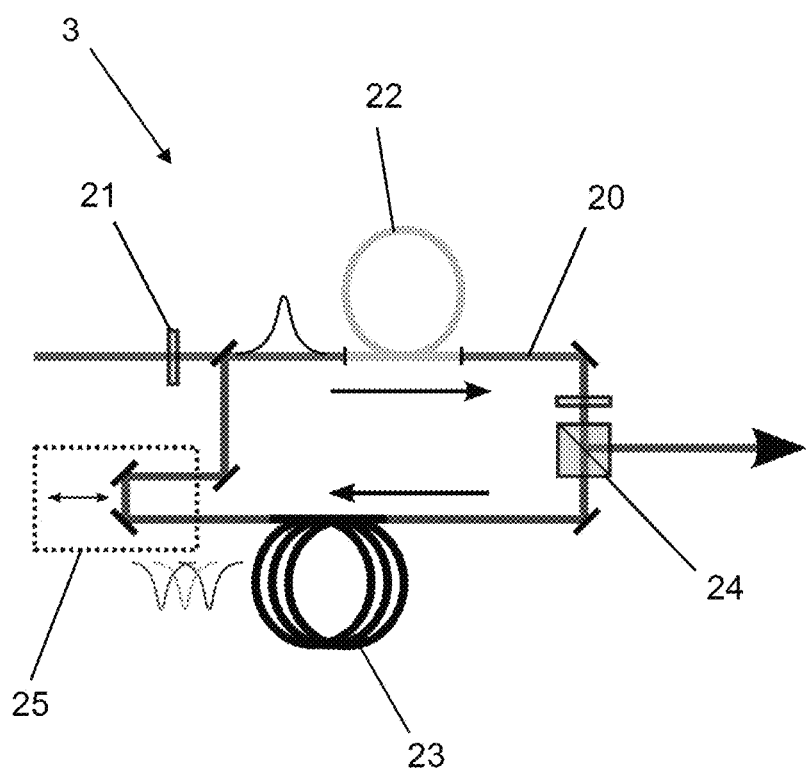
FIG. 6 shows an optical parametric oscillator of the device in accordance with the invention.

FIG. 1 schematically illustrates a device in accordance with the invention. This device comprises a pump laser 1, which emits laser pulses at a pump wavelength, wherein the pulse duration of the laser pulses is 0.5-100 ps. The pulse repetition frequency is in the range from 100 kHz to 100 MHz and is variably adjustable. The pump wavelength, i.e. the central wavelength of the laser pulses of the pump laser 1, in accordance with the invention is tunable between 1025 nm and 1050 nm. Arranged downstream of the pump laser 1 is an optical amplifier 2, which amplifies in the stated wavelength range. The laser pulses of the pump laser 1 are amplified in the optical amplifier 2 before they are coupled into an optical parametric oscillator (OPO) 3 and are converted there at least partially to laser pulses at a signal wavelength and an idler wavelength, which is different from the former, by a non-linear four-wave process. The average power at the output of the optical amplifier 2 ranges from 100 mW to 10 W. The OPO 3 is implemented e.g. as illustrated in FIG. 6.

Figure 2:
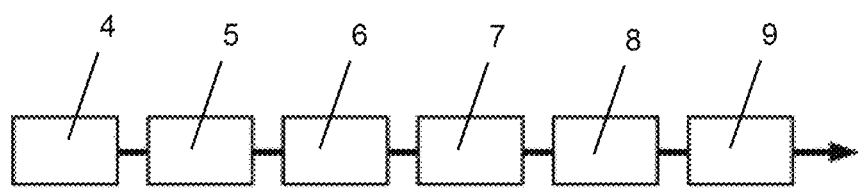
FIG. 2 shows the pump laser of the device according to the invention in the form of a block diagram.

FIG. 2 schematically illustrates the construction of the pump laser 1, which is constructed as a fiber laser. The latter comprises a saturable absorber mirror 4, a variable delay line 5 for setting the repetition frequency, a tunable wavelength-selective filter 6 for tuning the pump wavelength, a wavelength multiplexer (WDM) with a fiber-coupled pump diode, which pumps an active fiber as the laser medium 7, a fiber-coupled polarizer 8 and a partially reflective output coupling mirror 9 with a largely wavelength-independent characteristic. With the fiber-coupled filter 6, which is tunable in a very narrow-banded fashion, a specific wavelength is specified for the mode-locked fiber laser. That means that due to the losses for all other wavelengths in the emission range of the laser medium 7 a strong suppression in the resonator is brought about. Only the low-loss wavelength range, which is selected by way of the filter 6, allows oscillation. Only fiber-coupled components that show no, or only low, spectral variation of the transmission are used in the pump laser 1. To provide fiber connection of the saturable absorber 4, a (variable) telescope optics can be used. The free beam section can here account for less than 1% of the total resonator length. The fibers of the individual components are in principle polarization-maintaining and are used in base-mode fashion. It is not absolutely necessary to use a fiber-coupled polarizer 8 if the tunable filter 6 by itself exhibits a strong polarization-dependence. If not, the polarizer 8 is necessary to allow the operation in only to one polarization state and in this way ensure a temporally stable operation. After the output coupler 9, an isolator (not illustrated) is used at the output so as not to perturb the operation of the pump laser 1 by back reflections.

Figure 3:
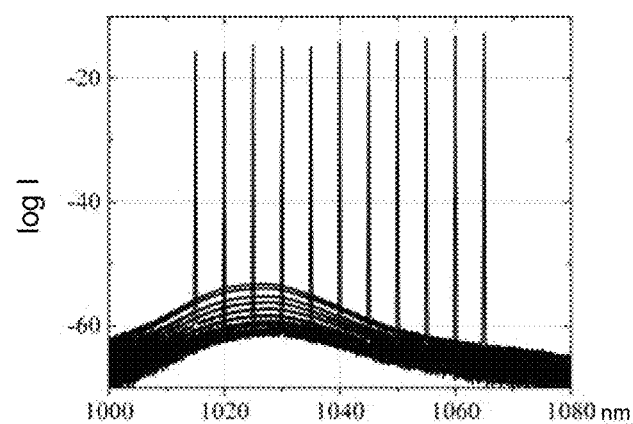
FIG. 3 shows the emission spectrum of the pump laser in accordance with FIG. 2.

FIG. 3 shows the output spectrum (logarithmic spectral intensity as a function of the wavelength between 1000 nm and 1080 nm) for different filter settings of the filter 6 in a practically realized exemplary embodiment. The filter bandwidth of the used filter is 120 pm at −3 dB. It is possible to operate the pump laser 1 with a greater filter bandwidth and to achieve thereby a shorter pulse duration of the laser pulses. In this way it is possible without complicated and broadband dispersion compensation in the laser resonator to generate a spectral bandwidth of the laser pulses of up to 400 pm and a pulse duration of less than 10 ps. Due to the filter bandwidth, the pulse duration can be specified in wide ranges. In the exemplary embodiment, it is possible to generate a pulse duration in the region of 10 ps at a filter bandwidth of 580 pm over the wavelength range from 1015 nm to 1065 nm.

Figure 4:
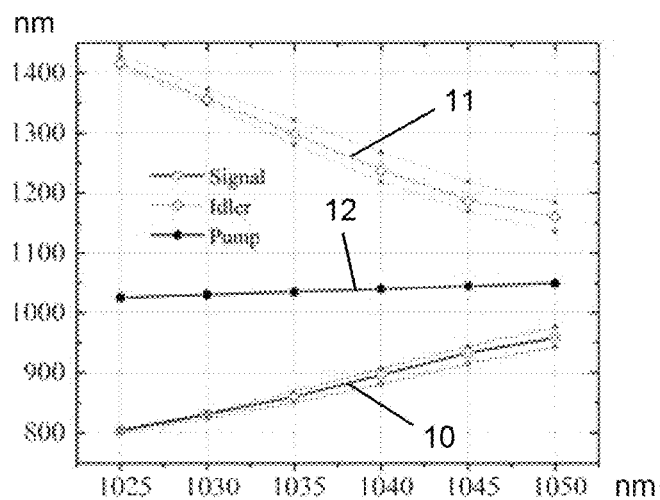
FIG. 4 shows a diagram of the signal and idler wavelengths of the laser pulses generated in accordance with the invention for different pump wavelengths and repetition frequencies.

According to the invention, an efficient energy transfer in the (likewise fiber-based) OPO 3 can take place over wide wavelength ranges in dependence on the setting of the repetition frequency and the central wavelength of the pump laser 1. FIG. 4 shows the wavelength ranges in which it is possible to address laser pulses at the signal wavelength 10 and the idler wavelength 11 at different pump wavelengths 12. In the exemplary embodiment, the repetition frequency was varied in the range from 18.760 MHz to 18.807 MHz to produce the resonance of the pump pulses to the signal pulses with the different signal wavelengths in the OPO 3. This corresponds to a variation of the resonator length of the pump laser of just 20 mm. Since for each pump wavelength the optimum repetition frequency can be selected, the conversion efficiency in the wavelength converter of the OPO 3 is always optimum. A conversion efficiency from pump radiation to signal radiation of over 20% over the entire addressable wavelength range is possible.

Figure 5A:
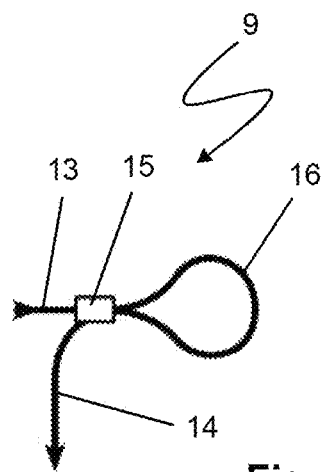
FIG. 5 shows schematic illustrations of output couplers of the pump laser in accordance with the invention in two variants.

FIG. 5a shows a possible realization of a fiber-coupled output coupler 9 of the pump laser 1 used in accordance with the invention. The output coupler 9 is connected to a base-mode and polarization-maintaining input fiber 13 and an output fiber 14 of the same type and has a reflectivity of 5-95% in the range of the gain spectrum of the laser medium. The light that is coupled into the input fiber 13 is guided back. The transmitted portion is coupled to the output fiber 14. The fibers 13, 14 are connected to a polarization-maintaining fiber-coupled beam splitter 15, which in each case has two input and output connections. The two output connections are connected to one another by way of a fiber loop 16. The coupling ratio of the fiber-coupled beam splitter 15 can be between 1 and 49% and consequently sets an output coupling ratio between 3 and 99%.

Figure 5B:
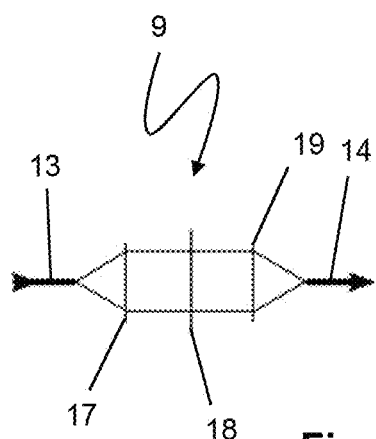

FIG. 5b shows a further variant of a fiber-coupled output coupler 9. Said variant comprises a collimation optical unit 17, a partially reflective broadband plane mirror 18 and a focusing optical unit 19

A further suitable variant (not illustrated) as an output coupler 9 is a free fiber end which can be provided with a broadband partially reflective coating.

FIG. 6 schematically illustrates the OPO 3. The OPO 3 comprises a resonator 20 with a wavelength-dependent resonator length. Additionally provided between the resonator 20 and the amplifier 2 (FIG. 1) is a spectral filter 21 for filtering the radiation that is to be coupled into the resonator.

The resonator 20 has a non-linear wavelength converter 22 (e.g. microstructured fiber with zero dispersion wavelength for transverse fundamental modes in the range of 1025-1350 nm) for generating radiation at a signal and idler wavelength. Provided in the resonator 20 is furthermore a strongly dispersive optical fiber 23 for generating a wavelength-dependent delay characteristic, and an output coupling element 24 for at least partially coupling the radiation out of the resonator 20. Optionally, the resonator 20 can have a variable delay line 25, which makes possible changing the absolute resonator length independently of the wavelength.

By changing the repetition rate of the pump laser 1, the wavelength characteristic of the radiation output by the OPO can be varied. The optical fiber 23 has a dispersion in the range of 10-100 ps/nm, preferably approx. 30 ps/nm, and a length of 10-1000 m, preferably approx. 250 m. It effects a temporal delay, i.e. stretching, of the laser pulses which are fed back in the resonator in the range of 95-100% of the reciprocal value of the repetition rate of the pump pulses or of a multiple thereof. In the process, the optical fiber 23 effects a temporal stretching of the pulses in the range of 1-500 ps per nm of spectral bandwidth. By way of the optical fiber 23, the spectral bandwidth of the laser pulses at the signal and idler wavelength is strongly reduced with respect to the pump pulses. Amplification occurs only in the temporal overlap region of the respective pump pulse with the frequency components of the fed-back radiation which are spectrally stacked one behind the other in the time domain. In the steady state, the generated radiation is narrowband in a manner such that any occurring dispersive pulse stretching hardly has any influence. Consequently, it is possible to achieve depending on the strength of the dispersion near transform-limited spectral bandwidths.

The invention claimed is:

1. A device for generating laser pulses, the device comprising:
    a pump laser, which emits laser pulses at a pump wavelength with a repetition frequency, wherein the pulse duration of the laser pulses is 0.5-100 ps; and
    an optical parametric oscillator that converts the laser pulses of the pump laser at least partially to laser pulses at a signal wavelength and at an idler wavelength, which differs front the signal wavelength, wherein the optical parametric oscillator has an optical resonator with a fixed length, further comprising:
    a non-linear wavelength converter, which converts the laser pulses of the pump laser (1) to laser pulses at the signal wavelength and at the idler wavelength, and
    an output coupling element, which couples at least some of the radiation out of the optical resonator,
    wherein in the pump laser is tunable with respect to the pump wavelength and the repetition frequency, wherein the resonator has an optical fiber with a dispersion in the range of 10-100 ps/non at the signal or idler wavelength and a length of 10-1000 m.

2. The device as claimed in claim 1, comprising an optical amplifier which is arranged downstream of the pump laser and amplifies the laser pulses of the pump laser before the laser pulses are converted in the optical parametric oscillator.

3. The device as claimed in claim 2, wherein the optical amplifier has an amplitude modulator.

4. The device as claimed in claim 2, wherein an optical isolator is arranged downstream of the optical amplifier.

5. The device as claimed in claim 2, wherein the pump laser has a laser resonator, a saturable absorber, an optically pumped laser medium arranged in the laser resonator, and an output coupler, wherein also arranged in the laser resonator is a wavelength-selective filter.

6. The device as claimed in claim 5, wherein the wavelength-selective filter has a filter bandwidth of 50-1000 pm.

7. The device as claimed in claim 5, wherein the wavelength-selective filter is tunable in the wavelength range in which the laser medium amplifies the radiation circulating in the laser resonator.

8. The device as claimed in claim 1, wherein the pump laser is a fiber laser.

9. The device as claimed in claim 1, wherein the pump laser emits laser pulses with a repetition frequency between 1 MHz and 20 MHz, wherein the relative tenability of the repetition frequency is up to 5%.

10. The device as claimed in claim 1, wherein the pump wavelength is in the range between 1015 and 1060 nm.

11. A method for generating laser pulses using a device as claimed in claim 1, wherein the method comprises the following steps:
    generating laser pulses at a pump wavelength with a repetition frequency,
    feeding back radiation in the optical resonator of the device, and
    at least partially converting the laser pulses to laser pulses at a signal wavelength and an idler wavelength, which differs from the signal wavelength, by way of the non-linear wavelength converter of the device, wherein the laser pulses are temporally stretched by the optical fiber in the resonator such that the temporal stretching of the laser pulses is 1-500 ps per nm of spectral bandwidth of the laser pulses, wherein the signal wavelength and the idler wavelength are varied by varying the pump wavelength and the repetition frequency at a fixed length of the optical resonator.

* * * * *